June 18, 1963 C. A. MIDDLETON ETAL 3,094,334
MATERIAL SPREADER
Filed March 23, 1961 2 Sheets-Sheet 1

INVENTORS
Carlesle A. Middleton
Thomas B. Middleton
Howard P. Johnson
BY Walter G. Finch
ATTORNEY June 18, 1963
C. A. MIDDLETON ET AL
3,094,334
MATERIAL SPREADER
Filed March 23, 1961
2 Sheets-Sheet 2
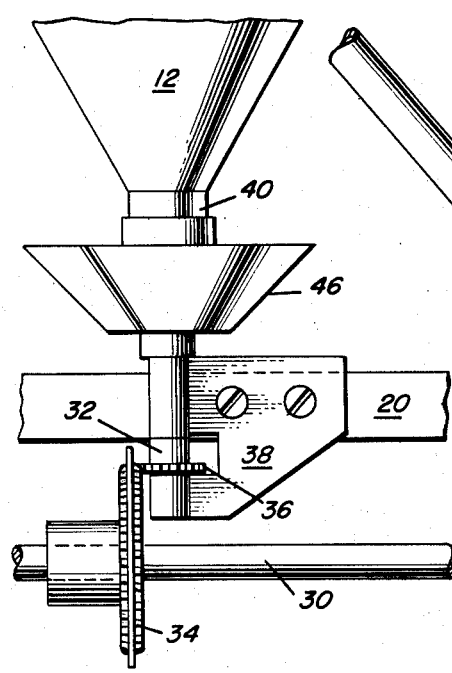
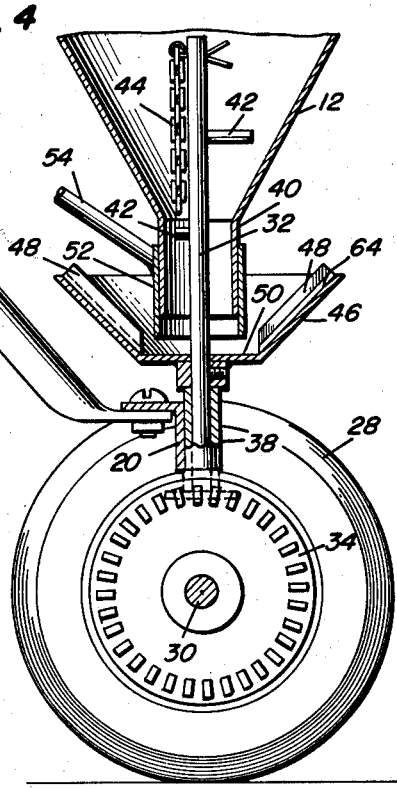
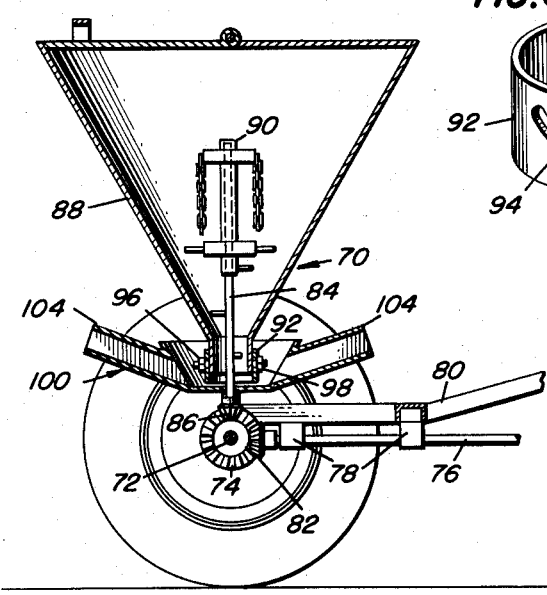
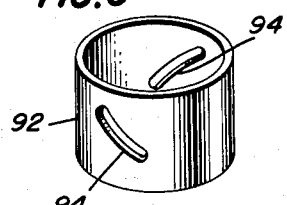
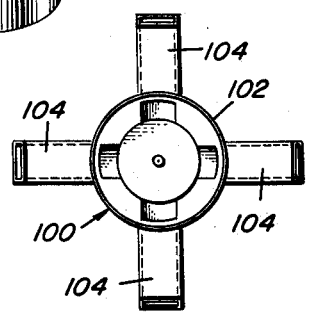
INVENTORS
Carlesle A. Middleton
Thomas B. Middleton
Howard P. Johnson
BY Walter G. Finch
ATTORNEY large heavy cart 70, as shown in FIG. 5, incorporating features of this invention, the operating power
United States Patent Office 3,094,334
Patented June 18, 1963

3,094,334
MATERIAL SPREADER
Carlesle A. Middleton, 38 Dungarrie Road, Baltimore 28, Md.; Thomas B. Middleton, 4940 Rodman St. NW., Washington, D.C.; and Howard P. Johnson, 1901 Fairbank Road, Baltimore 9, Md.
Filed Mar. 23, 1961, Ser. No. 97,807
8 Claims. (Cl. 275—8)

This invention relates generally to scattering unloaders, and more particularly it pertains to improvements in feeding, dispensing, and distributing apparatus for use in fertilizer and seed spreaders.

Hopper type fertilizer and seed broadcasting carts are commonly available. In general, these carts have lacked the ability to widely and uniformly distribute the material, thus requiring a great many passes over a given area to adequately provide coverage thereof.

A principal object of this invention, therefore, is to provide centrifugal distributing means of a novel upturned type in which the material is fed thereto axially in measured amount and thrown violently outwardly and upwardly in a tossing motion, to cover both distant and nearby areas of ground.

Another object of this invention is to provide a lightweight and compact material distributing hopper cart which is efficient in operation and which can be manufactured economically.

Still another object of this invention is to provide an improved material impeller which is not readily jammed or overloaded, and which starts easily, requiring a minimum of power.

These and other objects and attendant advantages of this invention will become more readily apparent and understood from the accompanying specification and drawings in which:

FIG. 3 is a fragmentary detail elevation showing the impeller distributor drive gear;

FIG. 4 is a vertical longitudinal section taken through the center of the cart;

FIG. 5 is a vertical longitudinal section taken through the center of the cart illustrating a second or power driven embodiment of the invention;

FIG. 6 is an enlarged perspective depicting a feed sleeve for the spreader of FIG. 5; and FIG. 7 is a plan view of a tossing impeller for the power spreader.

Figure 1:
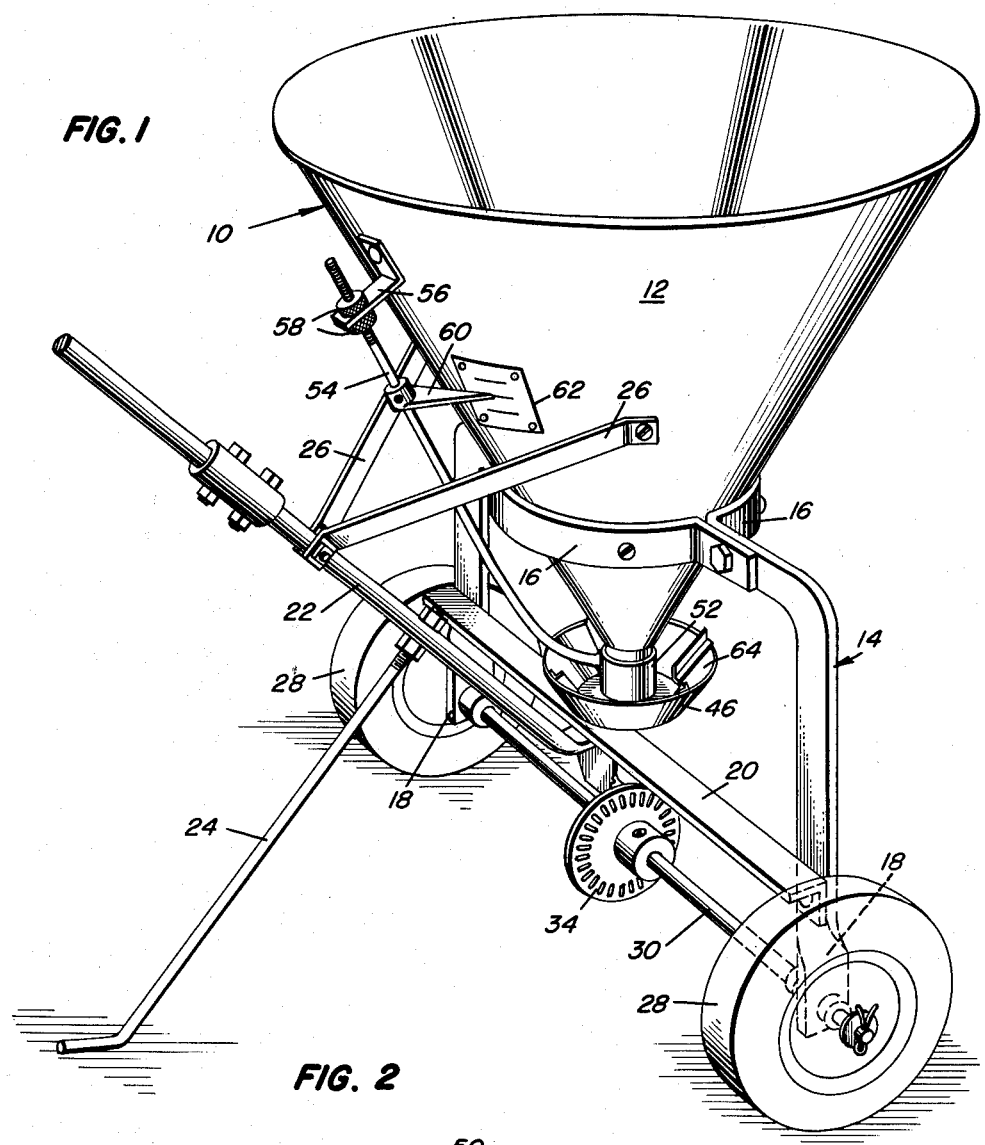
FIG. 1 is a perspective drawing of a hand-propelled fertilizer spreader cart embodying novel features of this invention.

Referring now to the details of the drawings, in FIG. 1 there is shown a hand propelled spreader cart, which is indicated generally by reference numeral 10.

This spreader cart 10 includes a metal strap frame 14. The frame 14 is made of two partly overlapping inverted L-shaped halves 16, with the overlapping portions of each in the form of a semi-circle. When the halves 16 of the frame 41 are placed in opposition and bolted together, the resulting frame 14 provides a centered circular mount into which an inverted conical shaped hopper 12 is secured. The depending portions of the frame 14 are twisted at ninety degrees and drilled to provide a pair of bearing ends 18.

A crosspiece 20 of structural angle is secured across the frame above the twisted ends 18 thereof. A metal rod handle 22 is secured by a flattened bent end to the center of the crosspiece 20 and extends upwardly at a convenient pushing angle to terminate in a hand grip (not shown).

A foot rest 24 is secured at right angles to the handle 22, and it extends downwardly to the rear of the cart 10. A pair of diverging brace straps 26 are secured to the handle 22, and their forward ends are bolted to the sides of hopper 12.

A pair of wheels 28 are keyed or otherwise tightly secured on a common axle 30 of the cart 10. A bevel gear arrangement, shown in detail in FIG. 3, transmits power from the rotating axle 30 to a vertical shaft 32, and it consists of a large diameter sprocket wheel which is keyed to the axle 30 and a small cogwheel 36 keyed to the vertical shaft 32.

A bearing bracket 38 which is bolted to the crosspiece 20 supports the shaft 32 which extends within the hopper 12, as shown in FIG. 4. Shaft 32 is coaxially arranged with respect to a cylindrical spout 40 which is secured to the bottom of the hopper 12.

The shaft 32 is provided with a plurality of outjutting stirring rods 42 within the hopper 12 and spout 40. A length of chain 44 is shackled by one end to the top of the shaft 32.

An impeller distributor 46, in the form of an inverted truncated cone, is secured to the shaft 32 below the spout 40. To the sloping inside 64 of the distributor 46 there are secured several radial barrier strips 48 which do not extend over the flat or truncated bottom area 50 thereof.

An adjustable sleeve 52, slidably fitted to the outside of the spout 40, is provided to selectively open or close the gap between the bottom thereof and the area 50 of the distributor 46. For this purpose, a threaded adjusting rod 54 is secured to the side of the sleeve 52, and it extends as shown in FIG. 1 to a bracket 56 secured to the side of the hopper 12.

A pair of jam nuts 58 on the threads of rod 54 adjacent the bracket 56 permit adjusting and locking of the vertical position of the sleeve 52 as desired. A pointer 60, which is fastened to the rod 54, and a scale 62, which is secured to the hopper 12, aid in selecting a predetermined feed rate of material from the hopper 12 as governed by this adjustment.

Figure 2:
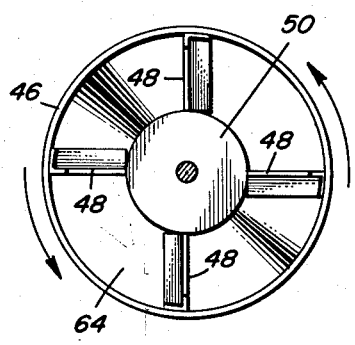
FIG. 2 is a detail plan view of the impeller distributor for the cart illustrated in FIG. 1.

In use, the hopper 12 is filled with the material, such as fertilizer or seed, which is to be distributed. The adjustment rod 54 is set for a desired feed rate. The cart 10 is then manually pushed over the ground to be covered. The rotating axle 30 of the cart 10 drives the vertical shaft 32 together with the chain 44, the stirring rods 42, and impeller distributor 46, at high speed. Material from the hopper 12, such as the previously mentioned seed, fertilizer, etc. which is allowed to pass under the bottom of sleeve 52 is rotated by the perimeter of the flat area 50 of the distributor 46, shown in FIG. 2, and is thrown by centrifugal force to the inside conical surface 64 of the distributor 46. The material is then caught up by the strips 48, which impart still greater velocity thereto until the material discharges into space in an upwardly and outwardly directed spiral. Such a trajectory for the propelled material is especially effective as is indicated by the four to five foot radius of distribution of the material commonly obtained in the small hand propelled embodiment of the cart 10 described. Furthermore, the chain 44 and stirring rods 42 working in the non-cornered conical hopper 12 to thoroughly break up the material and prevent clogging of the cart 10.

In a larger heavy cart 70, as shown in FIG. 5, incorporating features of this invention, the operating power for the cart is taken from a power take-off of a tractor. As shown in FIG. 5, the axle 72 of the power driven cart 70 is provided with an idle bevel gear 74 thereon.

A drive shaft 76, which is supported by pillow blocks 78 on a tow bar 80, connects the tractor power take-off (not shown) with a small bevel drive gear 82. This drive gear 82 rotates an idle bevel gear 74, located on axle 72, which, in turn, rotates a vertical shaft 84, mounted as previously described in connection with the cart 10 of FIGS. 1 to 4, through another bevel gear 86 located at its lower end.

This vertical shaft 84 like the shaft 32 of the preceding embodiment of cart 10 is bearing mounted to extend coaxially into a sleeved hopper 88. However, the uppermost stirring rods and chains are removably mounted as a tubular assembly 90 which slips over the end of shaft 84 and rotates with it.

An adjustable feed sleeve 92 indicated generally in FIG. 5 and shown in detail in FIG. 6, is provided with helical slots 94, and it is mounted by adjustment bolts 96 and 98 on the spout end of the hopper 88.

A heavy duty impeller distributor 100 is fastened on shaft 84 beneath the feed sleeve 92. This impeller distributor 100 consists of an open top flat bottomed pan 102 through whose walls extend a plurality of outwardly and upwardly directed tubular sling arms 104 as best illustrated in FIG. 7.

These sling arms 104, as they rotate at higs speed, exert a powerful centrifugal force to the fertilizer or seed material passed thereto and throw it outwardly and upwardly so as to reach the outer diameter of a large ground area. The conical inside 106 of the pan 102 tosses still other fertilizer or seed material by centrifugal force to a lesser intermediate distance, thus well covering a large area of ground.

Obviously, many modifications and variations of the present invention are possible in light of the above teachings. It is, therefore, to be understood that within the scope of the appended claims the invention may be practiced otherwise than as specifically described.

What is claimed is:

1. A spreader for centrifugally spreading material, comprising, a structure including a centered mount having a horizontally mounted shaft spaced therefrom, with spaced wheels positioned on said horizontally mounted shaft, an inverted conical shaped hopper for material to be spread positioned in said mount, means including a vertical shaft extending upwardly through and into said hopper, means on said vertical shaft and positioned in said hopper for breaking up said material in said hopper for smooth flow therefrom, means for mechanically coupling said shafts together, a distributor having a truncated cone impeller with a plain flat distributing area and upwardly and outwardly extending sloping sides with vanes thereon, said distributor being positioned axially below said hopper for receiving material from said hopper first on said distributing area and then broadcasting said received material from said distributing area upwardly and outwardly by said upwardly and outwardly extending sloping sides of said truncated cone impeller for centrifugally dispensing said received material, and means for powering said horizontally arranged shaft so as to cause said material to move from said hopper to said impeller distributor to be dispensed centrifugally therefrom.

2. A spreader as recited in claim 1, wherein said centered mount is of circular shape and consists of two partly overlapping inverted L-shaped halves with overlapping end portions each being in the form of a semi-circle, with said halves being placed in opposition and secured together.

3. A spreader as recited in claim 1, and handle means secured to said structure for manually powering said spreader.

4. A spreader as recited in claim 1, and motor means coupled to said horizontally mounted shaft for mechanically powering said spreader.

5. A spreader as recited in claim 1, wherein said means on said shaft for breaking up said material includes outjutting stirring rods secured to said vertical shaft of said spreader.

6. A spreader as recited in claim 1, wherein said means on said shaft for breaking up said material includes at least one chain secured by one end of said vertical shaft.

7. A spreader as recited in claim 1, and means including a centering spout positioned between the inverted end of said hopper and impeller distributor for centering feeding of material from said hopper to said distributor.

8. A spreader as recited in claim 7, and means for adjusting the rate of feed of said material from said hopper to said distributor for dispensing therefrom.

References Cited in the file of this patent
UNITED STATES PATENTS

| | | |
|---|---|---|
| 619,055 | Taylor | Feb. 7, 1889 |
| 856,632 | Griswold | June 11, 1907 |
| 1,107,992 | Parrish | Aug. 18, 1914 |
| 2,535,414 | Heidger | Dec. 26, 1950 |
| 2,600,167 | Jones | June 10, 1952 |
| 2,672,259 | Hobgood | Mar. 16, 1954 |
| 2,874,878 | Stokland | Feb. 24, 1959 |

FOREIGN PATENTS

| | | |
|---|---|---|
| 204,822 | Austria | Aug. 10, 1959 |
| 493,008 | Great Britain | Sept. 30, 1938 |